(12) United States Patent
Starbuck et al.

(10) Patent No.: US 7,194,070 B2
(45) Date of Patent: *Mar. 20, 2007

(54) INTEGRATED TELEPHONE CALL AND CONTEXT NOTIFICATION MECHANISM

(75) Inventors: Bryan T. Starbuck, Redmond, WA (US); Deana R. Fuller, Seattle, WA (US); Martijn E. Van Tilburg, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/205,676

(22) Filed: Aug. 17, 2005

(65) Prior Publication Data

US 2005/0271189 A1   Dec. 8, 2005

Related U.S. Application Data

(63) Continuation of application No. 10/835,823, filed on Apr. 30, 2004, now Pat. No. 6,977,993.

(51) Int. Cl.
*H04M 1/64* (2006.01)
(52) U.S. Cl. .................. 379/88.11; 379/88.13
(58) Field of Classification Search ............ 379/88.11
See application file for complete search history.

(56) References Cited

U.S. PATENT DOCUMENTS

| | | | |
|---|---|---|---|
| 5,200,994 A * | 4/1993 | Sasano et al. ......... 379/142.06 |
| 6,041,103 A * | 3/2000 | La Porta et al. ........... 379/67.1 |
| 6,192,116 B1 * | 2/2001 | Mayak ................. 379/142.08 |
| 6,285,364 B1 * | 9/2001 | Giordano et al. ........... 715/804 |
| 6,310,944 B1 * | 10/2001 | Brisebois et al. ...... 379/142.01 |
| 6,542,586 B1 * | 4/2003 | Helstab .................. 379/93.19 |
| 6,549,621 B1 * | 4/2003 | Christie et al. ............. 379/230 |

\* cited by examiner

*Primary Examiner*—Fan Tsang
*Assistant Examiner*—Simon Sing
(74) *Attorney, Agent, or Firm*—Workman Nydegger

(57) ABSTRACT

A mechanism for placing a telephone call while at the same time communicating context (e.g., subject, importance and/or nature) of the telephone call. The caller uses a mechanism on a user interface to instruct a caller computing system to place a telephone call to a callee computing system. Using the same user interface, the caller also identifies some contextual information for the telephone call such as, for example, the subject, importance and/or nature of the telephone call. The caller computing system then constructs a call invitation data structure that includes both an invitation to the callee to engage in a telephone conversation and the user-entered identification of the context of the telephone call. Upon receiving the call invitation data structure, the callee computing system reads the identification of the context of the telephone call, and then takes appropriate action based on the context for the telephone call.

16 Claims, 4 Drawing Sheets

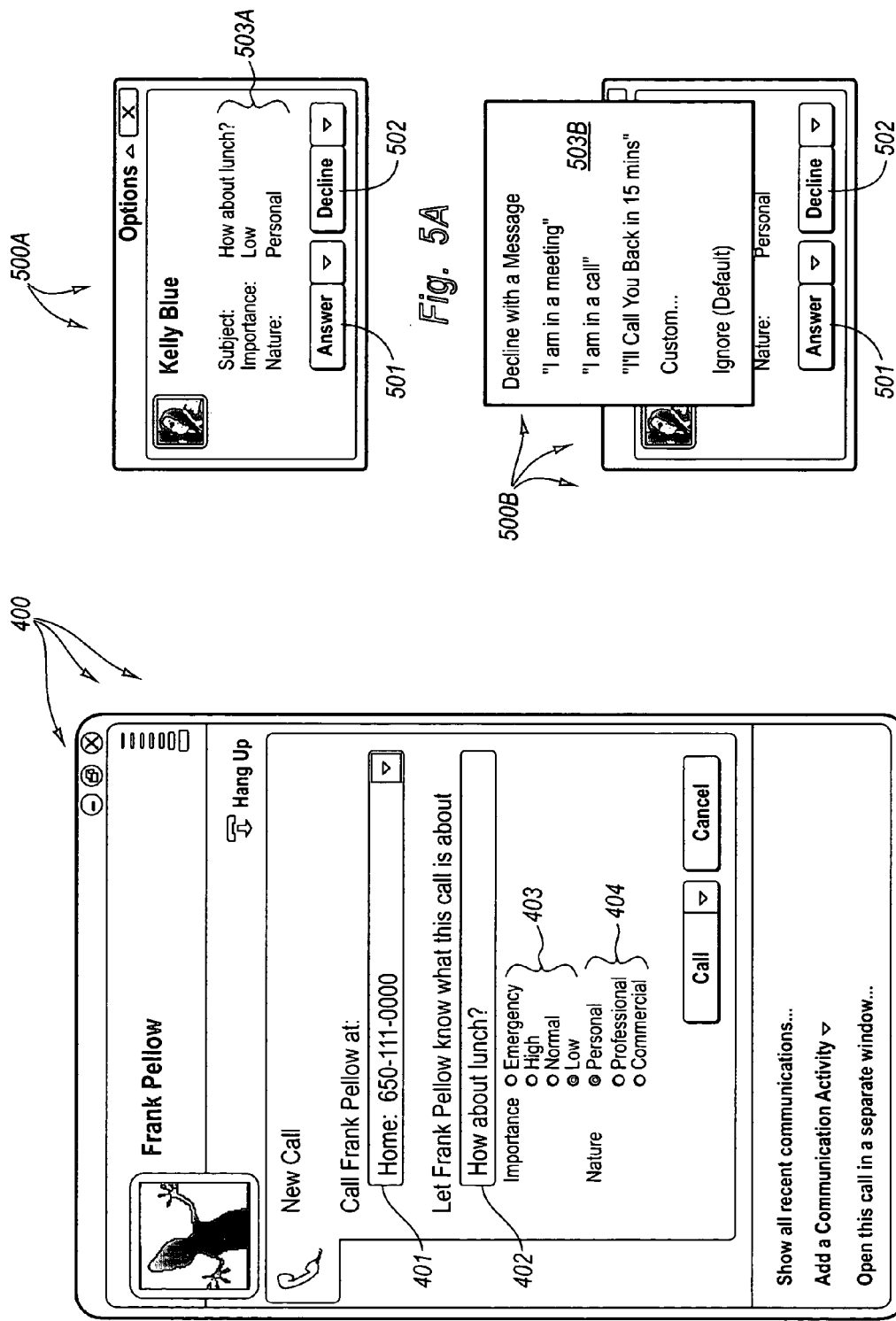

INTEGRATED TELEPHONE CALL AND CONTEXT NOTIFICATION MECHANISM

CROSS-REFERENCE TO RELATED APPLICATIONS

This application is a continuation of U.S. application Ser. No. 10/835,823, filed Apr. 30, 2004 now U.S. Pat. No. 6,977,993, and entitled "INTEGRATED TELEPHONE CALL AND CONTEXT NOTIFICATION MECHANISM" and which is incorporated here by reference.

BACKGROUND OF THE INVENTION

1. The Field of the Invention

The present invention relates generally to telephony technology. More specifically, the present invention relates to mechanisms for integrating telephone calls with notification of context information for the telephone call to thereby allow for more informed decision making on whether or not to answer a telephone call, and regarding the circumstances surrounding the declining of the telephone call if declined.

2. Background and Relevant Art

The ability to communicate is an essential need common to all of humankind. The telephone is considered one of the most important advances in communication technology as it enabled individuals to engage in real-time verbal conversations over vast distances. Modem advances have enabled telephone conversations over more than traditional analog telephones and analog telephone networks. Telephone conversations are now possible over analog and digital mobile telephones. Furthermore, telephone conversations are possible using computers using a technology called Voice over IP (or VoIP for short). In this modern era, many other forms of communication have been developed including, for example, facsimile, e-mail, instant message, and others. Each form of communication has its distinct advantages and disadvantages.

Telephone calls are advantageous as they enable real-time voice conversations, which are considered more intuitive forms of communication as they simulate the audio of a face-to-face conversation, without the two parties being physically proximate. However, telephone calls can be quite invasive. Traditionally, a callee often had no information regarding a telephone call before deciding whether or not to answer the call. Caller ID is a technology that informs the callee of the telephone number (and sometimes the associated caller identity). This technology has proved quite popular as it allows the callee to identify the caller. The callee may thus make a more informed decision regarding whether or not to accept the call.

However, even with caller ID, the callee often still has no idea what the caller wants to talk about, how important the caller considers the call, or whether the call is work related or personal. This information would be quite helpful for the callee to make an informed decision regarding whether or not to accept the call. Furthermore, if the callee declines the call, the caller is left to wonder why the call was declined.

Of course, there are ways of letting people know context of a telephone call. These ways usually involve a separate communication of some type. For example, a caller may in advance talk with the callee to let them know of the purpose for an anticipated future call. Alternatively, a user may send an instant message indicating the subject or importance of a telephone call that the caller plans to make or is making. However, these mechanisms require a separate communication, which is a significant incremental time cost. Since wasting of time is one of the biggest concerns associated with answering an unwanted telephone call or answering a desired telephone call at an improper time, this incremental time cost can be quite intolerable.

Furthermore, the declining of a telephone call can itself cause unwanted messages. For example, the declining of a telephone call may communicate to the caller that the callee considers the caller to be unimportant, thereby sometimes leaving the caller to feel ignored, particularly if the caller knows the callee to be available to answer the call. This may also leave the caller in an uncomfortable position of wondering when the caller's concern will be addressed.

Therefore, what would be advantageous are mechanisms for providing more informative context for a telephone call (or the declining of a telephone call) without the significant incremental cost of establishing a separate communication regarding the telephone call.

BRIEF SUMMARY OF THE INVENTION

The foregoing problems with the prior state of the art are overcome by the principles of the present invention which are directed towards a mechanism for placing a telephone call while at the same time communicating context for the telephone call. For example, when placing a telephone call, a caller may inform the callee of the subject, importance or nature of the telephone call before the callee commits to whether or not to accept the telephone call. On the other hand, if the callee declines the telephone call, the callee may then communicate a statement back to the caller without actually accepting the telephone call. In accordance with the present invention, all this is possible using the same user interface that is used to place and answer telephone calls, thereby avoiding the time required to establish a separate communication channel to communicate this information.

The caller uses a mechanism on a user interface to instruct a caller computing system to place a telephone call to a callee computing system. Using the same user interface, the caller also identifies some contextual information for the telephone call such as, for example, the subject, importance and/or nature of the telephone call. The caller computing system then constructs a call invitation data structure that includes both an invitation to the callee to engage in a telephone conversation and the user-entered identification of the context of the telephone call. The caller computing system then transmits the call invitation data structure to the callee computing system.

Upon receiving the call invitation data structure, the callee computing system reads the identification of the context of the telephone call, and then takes appropriate action based on the context for the telephone call. For example, the callee computing system may cause a user interface to be displayed permitting the callee to answer the call, or decline the call with a statement to be returned to the caller. The context information may also be placed with the other call information in a call log. Furthermore, the context information may be used to determine appropriate rerouting of the telephone call. When declining a call, the callee computing system may communicate a statement to the caller regardless of whether or not the original call invitation included context for the telephone call.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4 illustrates a user interface that allows a user to place a telephone call and notify the callee of context information for the telephone call at the same time;

FIG. 5A illustrates a user interface that may appear when a callee computing system receives an incoming call in which the user interface notifies the callee of the context of the call; and FIG. 5B illustrates a user interface that allows the callee to decline the telephone call while at the same time informing the caller of the context for declining the call.

DETAILED DESCRIPTION OF THE PREFERRED EMBODIMENTS

Figure 1:
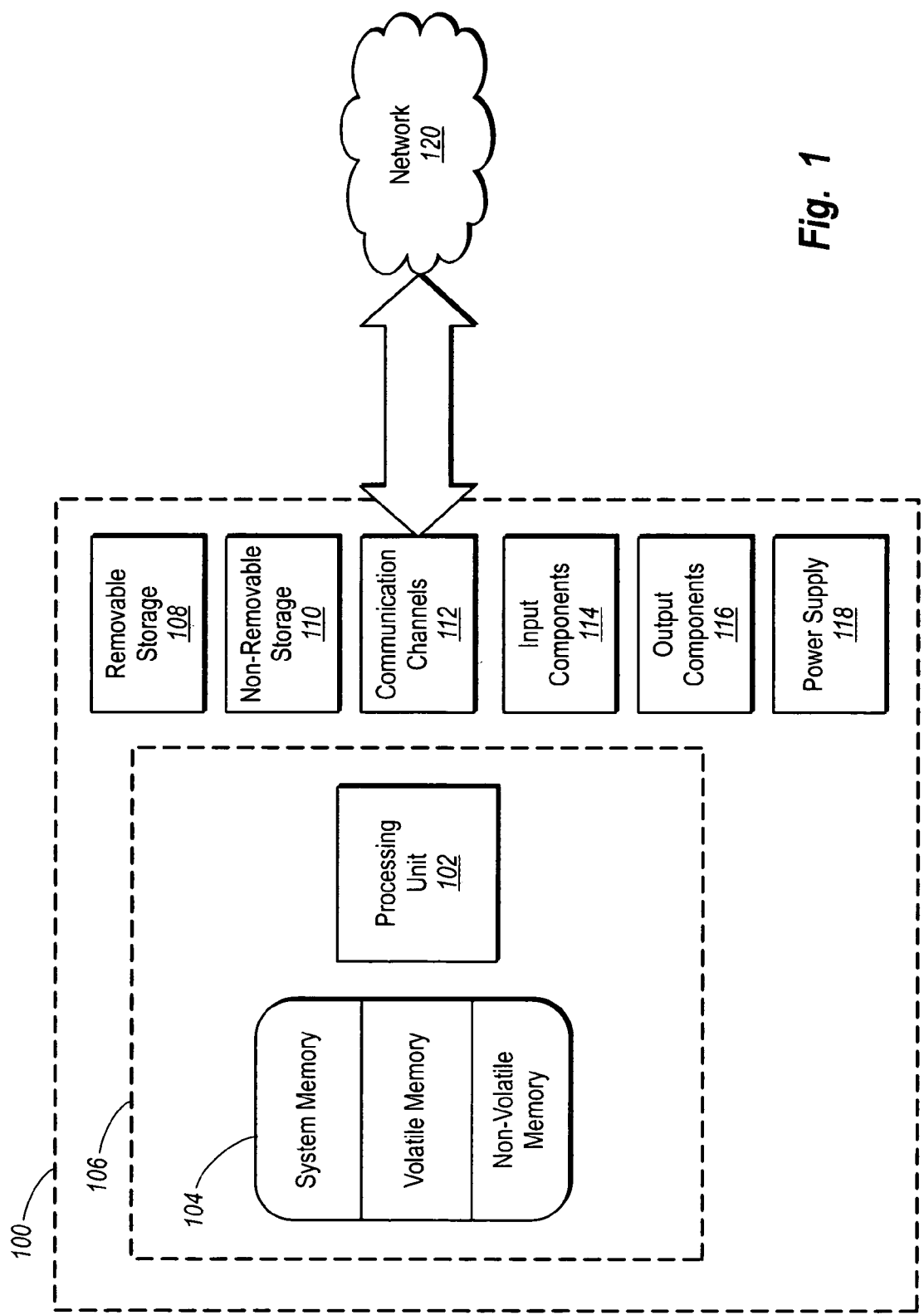
FIG. 1 illustrates a computing system in which the principles of the present invention may be employed.

The principles of the present invention relate to a mechanism for placing a telephone call while at the same time communicating context (e.g., subject, importance and/or nature) of the telephone call. The caller uses a mechanism on a user interface to instruct a caller computing system to place a telephone call to a callee computing system. Using the same user interface, the caller also identifies some contextual information for the telephone call such as, for example, the subject, importance and/or nature of the telephone call. The caller computing system then constructs a call invitation data structure that includes both an invitation to the callee to engage in a telephone conversation and the user-entered identification of the context of the telephone call. Upon receiving the call invitation data structure, the callee computing system reads the identification of the context of the telephone call, and then takes appropriate action based on the context for the telephone call. Regardless of whether the call invitation data structure includes context for the telephone call, the callee may decline the telephone call with a statement regarding the decline being communicated back to the caller.

Turning to the drawings, wherein like reference numerals refer to like elements, the invention is illustrated as being implemented in a suitable computing environment. The following description is based on illustrated embodiments of the invention and should not be taken as limiting the invention with regard to alternative embodiments that are not explicitly described herein.

In the description that follows, the invention is described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that several of the acts and operations described hereinafter may also FIG. 1 shows a schematic diagram of an example computer architecture usable for these devices.

For descriptive purposes, the architecture portrayed is only one example of a suitable environment and is not intended to suggest any limitation as to the scope of use or functionality of the invention. Neither should the computing systems be interpreted as having any dependency or requirement relating to anyone or combination of components illustrated in FIG. 1.

The invention is operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration, a computing system 100 typically includes at least one processing unit 102 and memory 104. The memory 104 may be volatile (such as RAM), non-volatile (such as ROM, flash memory, etc.), or some combination of the two. This most basic configuration is illustrated in FIG. 1 by the dashed line 106.

The storage media devices may have additional features and functionality. For example, they may include additional storage (removable and non-removable) including, but not limited to, PCMCIA cards, magnetic and optical disks, and magnetic tape. Such additional storage is illustrated in FIG. 1 by removable storage 108 and non-removable storage 110. Computer-storage media include volatile and non-volatile, removable and non-removable media implemented in any method or technology for storage of information such as computer-readable instructions, data structures, program modules, or other data. Memory 104, removable storage 108, and non-removable storage 110 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing system.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in software and hardware or hardware are also possible and contemplated.

Computing system 100 may also contain communication channels 112 that allow the host to communicate with other systems and devices. Communication channels 112 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

The computing system 100 may also have input components 114 such as a keyboard, mouse, pen, a voice-input component, a touch-input device, and so forth. Output components 116 include screen displays, speakers, printer, etc., and rendering modules (often called "adapters") for driving them. The computing system 100 has a power supply 118. All these components are well known in the art and need not be discussed at length here.

Figure 2:
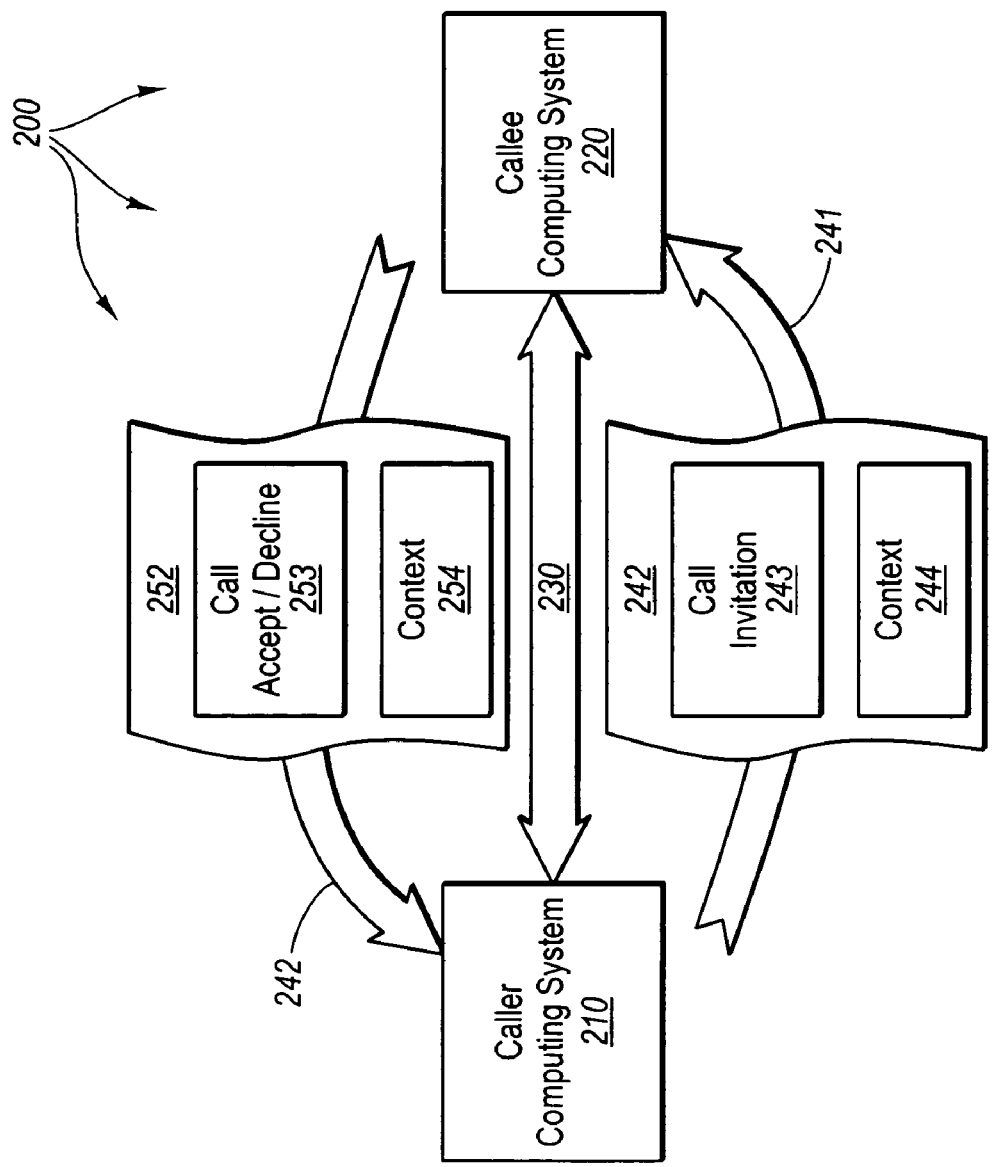
FIG. 2 illustrates a network environment including a caller computing system and a callee computing system capable of facilitating a real-time audio conversation between their respective users.

FIG. 2 illustrates a network environment 200 in which the principles of the present invention may be employed. The network environment includes a caller computing system 210 and a callee computing system 220. The caller computing system 210 is connectable through a bidirectional network 230 with the callee computing system 220. Each of the computing systems 210 and 220 may be structured as described above for the computing system 100. However, this need not be the case. The caller computing system 210 and callee computing system 220 may be any computing system, where a computing system is defined in this description and in the claims as any device or system capable of processing information and communicating telephone conversations over a network. Examples of such computing systems including desktop computers, laptop computers, tablet PCs, Personal Digital Assistants (PDAs), digital telephones, and the like. The principles of the present invention are not restricted to the structure or form factor of the caller or callee computing system. Arrows 241 and 251 represent some communication between the caller computing system 210 and the callee computing system 220 and will be described in further detail with respect to FIG. 3.

Figure 3:
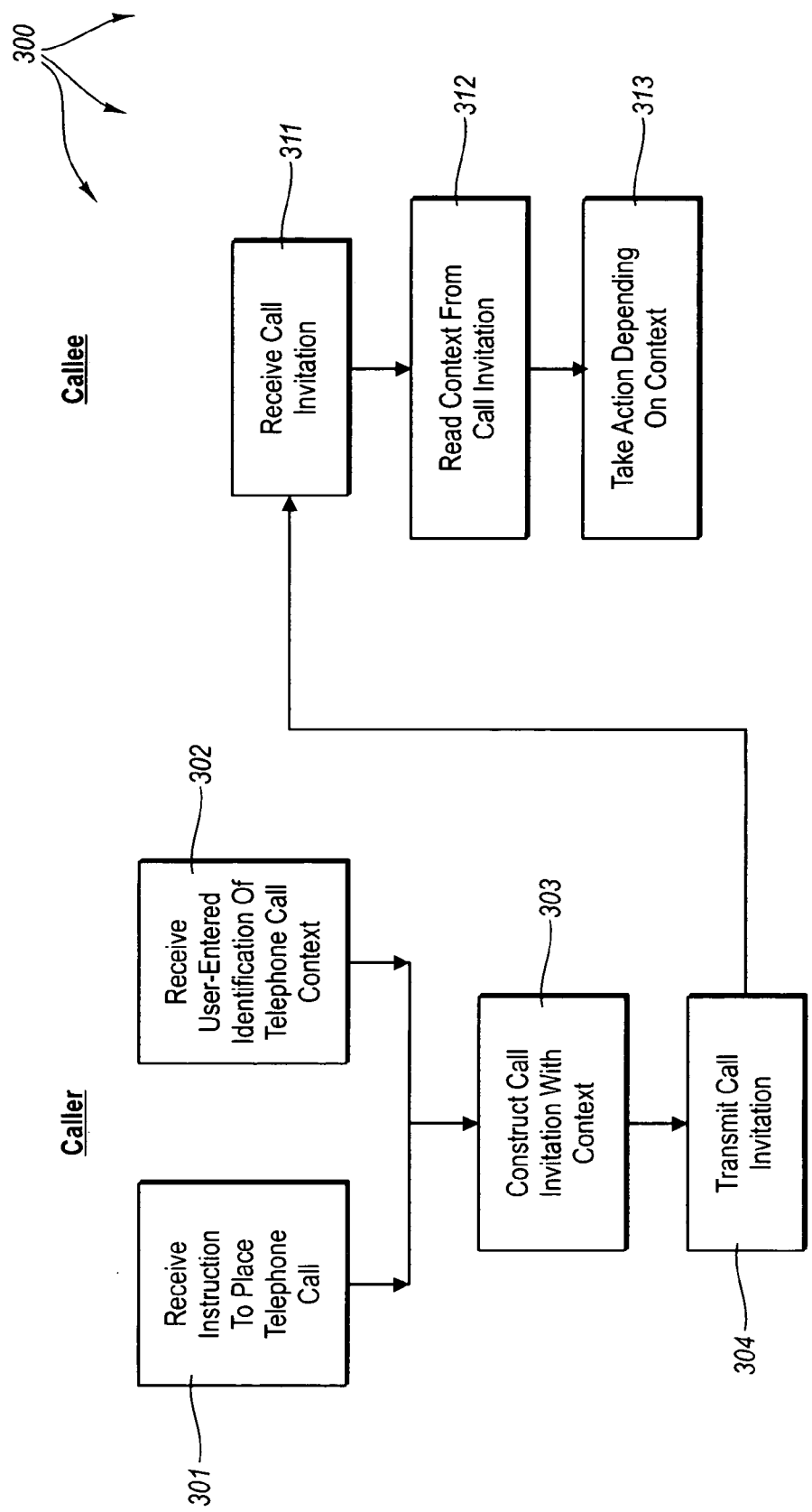
FIG. 3 illustrates a flowchart of a method for the caller and callee computing systems to facilitate the placement of a telephone call while including notification of context of the telephone call.

FIG. 3 illustrates a flowchart of a method 300 for the caller and callee computing systems to communicate context for a telephone call. Some acts of the method 300 are performed by the caller computing system 210 as represented in the left column of FIG. 3 under the heading "Caller". Other acts of the method 300 are performed by the callee computing system 220 as represented in the right column of FIG. 3 under the heading "Callee".

In accordance with the method 300, the caller computing system receives an instruction to place a telephone call to the callee computing system (act 301) as well as a user-entered identification of a context for the telephone call (act 302). The caller computing system 210 then constructs a call invitation data structure that includes both an invitation to the callee to engage in a telephone conversation and the user-entered identification of the context of the telephone call (act 303). The caller computing system 210 then transmits the call invitation data structure to the callee computing system (act 304). Accordingly, the caller computing system sends a call invitation along with an indication of the context of the telephone call. For example, as represented by arrow 241 in FIG. 2, the caller computing system 210 sends a call invitation data structure 242 to the callee computing system 220. The call invitation data structure 242 includes both the call invitation indication 243 as well as the context information 244.

The instruction to place the telephone call as well as the indication of the context for the telephone call may both be issued by the user of the caller computing system 210. FIG. 4 illustrates a user interface 400 that the caller computing system 210 may display to the user. The user interface 400 includes a callee identification field 401 in which the user may enter a telephone number. In this case, the callee identification field 401 has a drop down menu that may be linked to a contacts list to thereby allow for convenient identification of callee.

The user interface 400 also includes a subject identification field 402 in which the user may enter a custom statement regarding the anticipated subject of the telephone conversation. In addition or in the alternative, the user interface 400 may also include an importance field 403 in which the caller may designate the importance of the telephone call to the caller. Furthermore, the user may select the nature of the telephone call in the call nature field 404, whether the telephone call be of a personal nature, professional nature, or commercial nature. A call from one person to another outside of their professional work would likely be deemed a personal call. A call from one professional to another professional within the scope of their profession would likely be deemed a professional call. A call from one professional to a person which is only within the professional scope of the caller may likely be deemed a commercial call. In one embodiment, the nature of the call may be automatically selected based on how the callee is categorized within the caller's contacts list.

The subject, importance and nature of the callEach of these elements, either alone or especially in combination, provides significant information that is useful to a callee when deciding whether or not to answer a telephone call, and how the telephone call should be handled. Once the user has appropriate interfaced with the various user interface mechanisms, the user interface program may notify other components or modules within the caller computing system that there has been an instruction to place a telephone call, and what the associated context is.

Upon receiving the call invitation data structure (act 311), the callee computing system reads the identification of the context of the telephone call from the call invitation data structure (act 312), and takes action depending on the context of the telephone call (act 313). Appropriate action may include displaying a user interface providing the callee an option to accept or decline the telephone call, rerouting the telephone call, and/or recording the context of the telephone call in a call log.

For example, Figure 5A illustrates an example of a user interface 500A that may appear on the display of the callee computing system once the call invitation data structure is received. The user interface 500A includes a mechanism 501 for accepting the telephone call, and a mechanism 502 for declining the telephone call. Importantly, the user interface 500A also includes a context field 503A whereby the callee may view important information relevant to whether or the callee is to accept or decline the telephone call.

For example, the callee may elect to automatically decline all calls of a commercial nature. Furthermore, if the callee is engaged in a video conference for her annual performance review, the callee may choose not to answer a telephone call from her husband if the subject of the call is "Let's have lunch", if the importance of the call is "normal", and/or if the call nature is designated as "personal". However, the callee may indeed choose to exit the important video conference if she receives a call from her husband, and if the subject of the call is "Your daughter has had a serious accident at school-WE NEED TO TALK NOW", or if the importance is designated as an "emergency". This example demonstrates how the callee may make uninformed judgments regarding whether or not to answer a call if the user is not provided sufficient context for a telephone call, or if the user is only informed of the identity of the caller.

By selecting the decline mechanism 502, the user interface 500B of Figure 5B may be caused to appear. This user interface 500B may appear regardless of whether or not the original call invitation data structure 242 included any context at all. The user interface 500B includes a statement menu 503B that the callee may select from to designate a statement to be returned to the caller upon declining the telephone call. The statement may be any statement useful to the caller in discovering a context for the callee declining the telephone call. For example, the statement could include a reason for declining the telephone call (e.g., "I am in a meeting", "I am in a call" or the like), or may indicate a time that the callee will be available (e.g., "I'll call you back in 15 minutes") or the like. The callee may even select "Custom" to thereby enter a custom statement regarding the context for declining the call. Referring to FIG. 2, the callee computing system 220 sends a decline data structure 252 back to the caller computing system 210. The decline data structure 252 includes an indication that the call has been declined 253, as well as the contextual message 254 for the decline.

Alternatively or in addition to displaying a user interface giving the callee the option to accept or decline the telephone call, the callee computing system may take other appropriate action depending on the context of the telephone call. For example, the callee computing system may reroute the call to another device or system depending on the context. For example, the callee computing system may have a rerouting rule that specifies that any incoming calls marked with importance "emergency" must be forwarded to a cell phone number. Furthermore, all calls that include the word "tax" in the subject should be rerouted to another computing system used to file taxes. There are a myriad of other rerouting possibilities. The rerouting rules may be set by the callee. Other appropriate action may be to log the telephone call in a call log. The call log may include the designated subject, importance and nature of the call.

The network structure 230 used to communicate the call may be, for example, Plain-Old-Telephone-Service (POTS), a cell phone network (such as GSM), or Voice over IP (VoIP). When using VoIP, the call session between may be negotiated using Session Initiation Protocol (SIP). Using SIP, eXtensible Markup Language (XML) documents may be exchanged during the initial negotiation of call setup or even after the initial call setup. The context information may be provided with the call invitation data structure or after the initial call setup. SIP call setup currently includes a call invitation data structure. The call invention data structure 242 of FIG. 2 may extend upon this principle to include an XML document that includes the context for the telephone call. Likewise, SIP call setup current includes a decline data structure when the call is declined. The decline data structure 252 of FIG. 2 may extend upon this principle to include an XML document that includes the context for declining the telephone call.

If the network structure 230 is POTS or a cell phone network, the call invitation data structure 242 and the call decline data structure 252 may be transmitted using signals appropriate to these networks. However, both the caller and callee computing systems would have interpreters for decoding and digitally representing the call invitation data structure 242 and the decline data structure 252 for further processing.

Accordingly, a mechanism has been described for placing a telephone call while at the same time communicating context for the telephone call. For example, when placing a telephone call, a caller may inform the callee of the subject, importance or nature of the telephone call before the callee commits to whether or not to accept the telephone call. On the other hand, if the callee declines the telephone call, the callee may then communicate a statement back to the caller without actually accepting the telephone call. In accordance with the present invention, all this is possible using the same user interface that is used to place and answer telephone calls.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed is:

1. A computer program product for use in a network capable of communicating a telephone conversation between a caller computing system and a callee computing system, the computer program product comprising one or more computer-readable storage media having stored thereon computer-executable instructions that, when executed by a processor, cause the caller computer system to perform a method for the caller computing system causing the callee computing system to take an action related to the telephone conversation and to implement the following:

receive an instruction to place a telephone call by the caller computing system;

receive a user-entered identification of a context for the telephone call by the caller computing system, wherein the user-entered identification of the context for the telephone call identifies at least one of (a) a subject matter of the telephone call, (b) an importance of the telephone call, or (c) a call type that indicates whether the telephone conversation is to be personal, professional or commercial;

construct a call invitation data structure that includes both an invitation to the callee computer system to engage in a telephone conversation and the user-entered identification of the context of the telephone call; and transmit the call invitation data structure to the callee computing system such that in response to receiving the call invitation data structure the callee computer system automatically takes one or more actions depending on the context of the telephone call in accordance with one or more rules defined at the callee computer system for causing the callee computing system to automatically take the one more actions upon identification of the context of the telephone call from the call invitation data structure.

2. A computer program product in accordance with claim 1, wherein the user-entered identification of the context of the telephone conversation comprises an anticipated subject of the conversation.

3. A computer program product in accordance with claim 1, wherein the user-entered identification of the context of the telephone conversation comprises an estimated importance of the conversation.

4. A computer program product in accordance with claim 1, wherein the user-entered identification of the context of the telephone conversation comprises an indication of whether the telephone conversation is personal.

5. A computer program product in accordance with claim 1, wherein the user-entered identification of the context of the telephone conversation comprises an indication of whether the telephone conversation is professional.

6. A computer program product in accordance with claim 1, wherein the user-entered identification of the context of the telephone conversation comprises an indication of whether the telephone call is commercial.

7. A computer program product for use in a network capable of communicating a telephone conversation between a caller computing system and a callee computing system, the computer program product comprising one or more computer-readable storage media having computer-executable instructions stored thereon that, when executed by one or more processors of the callee computing system, cause the callee computing system to perform a method for the callee computing system to take action in response to receiving a telephone call depending on a communicated context for the received telephone call and to implement the following:

detect receipt of a call invitation data structure that includes both an invitation to the callee computer system to engage in a telephone conversation and user-entered identification of a context of the telephone call;

read the user-entered identification of the context of the telephone call from the call invitation data structure, wherein the user-entered identification of the context comprises one or more of an anticipated subject of the conversation, an estimated importance of the conversation, and an indication of whether the telephone conversation is personal, commercial or work-related; and automatically take one or more actions depending on the context of the telephone call and based on one or more rules defined at the callee computer system, the one or more rules for causing the callee computing system to automatically take the one or more actions upon reading the identification of the context of the telephone call from the call invitation data structure.

8. A computer program product in accordance with claim 7, wherein automatically taking one or more actions comprises choosing from a menu of one or more statements to be communicated to the caller computing system upon declining the telephone call.

9. A computer program product in accordance with claim 8, wherein at least one of the one or more statements on the menu comprise a reason for declining the telephone call.

10. A computer program product in accordance with claim 8, wherein the menu comprises a mechanism for entering a custom statement to be communicated to the caller computing system upon declining the telephone call.

11. A computer program product in accordance with claim 7, wherein the act of automatically taking one or more actions comprises accepting the telephone call.

12. A computer program product in accordance with claim 7, wherein the act of automatically taking one or more actions depending on the context of the telephone call comprises one or more of:

rerouting the telephone call and recording the context of the telephone call in a call log.

13. A computer program product for use in a network capable of communicating a telephone conversation between a caller computing system and a callee computing system, the computer program product comprising one or more computer-readable storage media storing computer-executable instructions for implementing a method for the callee computing system to decline a telephone call while communicating context for the declining of the telephone call, wherein the method comprising the following:

an act of detecting receipt of a call invitation data structure that includes an invitation to the callee computer system to engage in a telephone conversation and an identification of a context of a telephone call, and wherein the user-entered identification of the context for the telephone call identifies at least one of (a) a subject matter of the telephone call, (b) an importance of the telephone call, or (c) a call type that indicates whether the telephone conversation is to be personal, professional or commercial; and an act of automatically declining the telephone call depending on the context of the telephone call and in accordance with one or more rules defined at the callee computer system in response to receiving the call invitation data structure, the one or more rules for causing the callee computing system to automatically take actions based upon an identified context of the telephone call read from the call invitation data structure.

14. A computer program product in accordance with claim 13, wherein automatically declining the telephone call comprise providing one or more statements to be communicated to the caller computer system as a reason for declining the telephone call.

15. A computer program product in accordance with claim 13, wherein automatically declining the telephone call comprises a mechanism for entering a custom statement to be communicated to the caller computing system upon declining the telephone call.

16. A computer program product in accordance with claim 13, wherein the one or more computer-readable media are physical media.

\* \* \* \* \*